United States Patent [19]

Nakatsu

[11] Patent Number: 4,772,896

[45] Date of Patent: Sep. 20, 1988

[54] BOOKLET PRINTING APPARATUS

[75] Inventor: Shoji Nakatsu, Aichi, Japan

[73] Assignee: Hitachi, Ltd., Tokyo, Japan

[21] Appl. No.: 74,851

[22] Filed: Jul. 17, 1987

[30] Foreign Application Priority Data

Jul. 18, 1986 [JP] Japan ................................ 61-167913

[51] Int. Cl.[4] ................................................ G01D 15/10

[52] U.S. Cl. ................................ 346/76 PH; 219/216

[58] Field of Search ......................... 346/76 PH, , 136; 400/120; 219/216

[56] References Cited

U.S. PATENT DOCUMENTS 4,088,214 5/1978 Shindo et al. .................. 346/76 PH 4,194,108 3/1980 Nakajima et al. ................... 338/309

FOREIGN PATENT DOCUMENTS 56-34465 4/1981 Japan .

*Primary Examiner*—H. Broome

*Assistant Examiner*—M. M. Lateef

*Attorney, Agent, or Firm*—Antonelli, Terry & Wands

[57] ABSTRACT

A printing apparatus has a thermal head which is adapted to be pressed against a platen through a thermal ink film and a printing medium, thereby performing print on the printing medium. After the printing medium has been transported between the thermal head and the platen, the printing medium is transported with the leading edge of the printing medium being clamped by a pair of clamp rollers. The thermal head is pressed to the platen for printing while the printing medium is transported by the clamp rollers. Thus, pages of the printing medium, including, a booklet, are not inflated, and a printing displacement or a paper jam may be prevented.

15 Claims, 3 Drawing Sheets

BOOKLET PRINTING APPARATUS

BACKGROUND OF THE INVENTION

The present invention relates to a printing apparatus which is capable of printing on a booklet, such as bankbook, composed of a plurality of papers bound at one side. The printing apparatus is of the thermal transfer printing type.

A wire dot printing type of apparatuses has frequently been used for printing on a booklet, such as a bankbook, composed of a plurality of papers. For instance, in one wire dot print manner, the bankbook whose thickness is changed in accordance with a page to be printed is pressed against a reference guide by means of a platen, so that a printing surface position is always kept constant to be effected printing with means of the wire dot printing type. According to this printing method, it is advantageous to easily provide an apparatus that is capable of performing a clear print on a printing medium whose thickness is to be changed. It is, however, necessary to release the pressed condition of the bankbook whenever a print is started at a new line on a page. This needs an extra operation time. Thus, there is a disadvantage in enhancing the printing performance.

Also, in the above-described printing method, since the wire dot print means is used for printing, there is a problem that printing noises are large.

In order to solve this printing noise problem, it has been proposed to use a thermal transfer printing method in printing on a booklet. An example of this method is shown in Japanese Patent Unexamined Publication No. 34465/1981. In this printing manner, a thermal printing head is moved in a line direction for performing a print of a single line. However, when the print line of the bankbook is renewed after one printing operation, it is necessary to release the depression of the thermal print head. As in the wire dot print manner, it would be difficult to enhance the printing performance.

As described above, in the prior art, there is a problem such that it takes a long time to renew lines of the bankbook and it is difficult to enhance the printing performance.

A line dot type thermal printing method, in which a thermal ink film is depressed against a platen through a thermal printing head by means of a spring to thereby perform a printing, is known as a printing method which is capable of performing the printing without needs to release the depressed condition of the thermal printing head during the renewing operation of the lines on papers.

In a printer of this type, the printing medium and the thermal ink film are simultaneously and continuously fed by the rotation of the platen roller, thereby performing the feed of the printing medium. For this reason, it is unnecessary to release the depressed condition of the thermal head during the paper feed operation. It is, therefore, possible to perform a high speed printing operation.

Such a printing system involves the following disadvantages, when it is applied to a printer for printing a booklet composed of a plurality of papers such as a bankbook.

As is well known in the art, in order to obtain a clear print by a thermal printer, it is necessary to enhance a contactability among the printing paper, the thermal head and the thermal ink film. Since intermediate papers of a bankbook are relatively thin, when the bankbook is fed under the depressed condition with a large depression pressure while keeping a good contactability, a displacement or offset of the intermediate papers would be caused, resulting in inflation of the papers. This would cause problems such as a printing displacement or a jam of the bankbook or the thermal ink film.

In order to solve the above-described problems, it would be possible to perform the printing by reducing the depression pressure of the thermal head to a certain level. In this case, since the contactability between the bankbook, the thermal ink film and the thermal head would be degraded, the obtained print would be unclear. Otherwise, in order solve the problems, it would be possible to prolong an application time period of pulses to be applied to a heating resistor of the thermal head, thereby performing the printing with a high printing energy. However, in this case, the printing speed is of course slow down, so that it would be impossible to perform the printing at a desired printing speed.

SUMMARY OF THE INVENTION

It is an object of the present invention to provide a printing apparatus for printing with a line type thermal head that is capable of performing a high speed operation for a booklet or the like composed of a plurality of papers such as a bankbook.

This and other objects are attained by providing a printing apparatus in which the bound papers such as a bankbook are clamped.

According to the present invention, prior to starting the printing with the line type thermal head, the booklet composed of a plurality of bound papers is clamped, to thereby prevent any displacement or offset of the intermediate printing papers of the booklet to avoid the generation of inflation thereof by a relative movement between the printing element and the booklet during the printing operation. By virtue of this arrangement, it is possible to prevent the generation of printing displacement or paper jam, and it is possible to keep a good contactability between the printing element and the intermediate printing papers of the booklet, thus performing a clear printing.

DETAILED DESCRIPTION OF THE EMBODIMENTS

Prior to an explanation of a printing apparatus according to the present invention, disadvantages or difficulties inherent in the prior art will be described in detail with reference to FIGS. 3 to 5.

Figure 3:
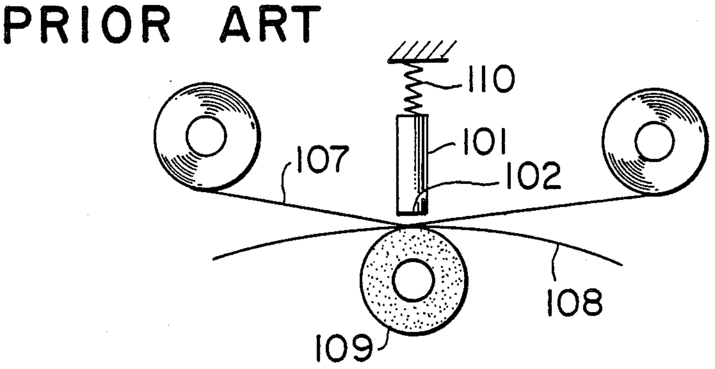
FIG. 3 PRIOR ART
FIG. 3 is a schematic cross-sectional view showing a printing section of a conventional line dot type thermal printer when performing a single leaf printing.

The line dot type thermal printer according to the aforesaid prior art includes a printing mechanism, as shown in FIG. 3, in which a thermal ink film 107 is depressed or pressed against a platen roller 109 through a heat-sensitive printing head 101 of the line dot type by means of a spring 110.

In the printing operation of the printer, a printing paper 108 is pressed against the platen roller 109 by means of the spring 110 with the thermal ink film 107 interposed therebetween, to which film applied is an ink to be molten by a heating resistor 102 on the heat-sensitive printing head 101 (hereinafter referred to as a thermal head), to thereby perform the printing. Also, for feeding the printing paper, the platen roller 109 is rotated to simultaneously and continuously feed the printing paper 108 and the thermal ink film 107. In other words, since it is unnecessary to release the depressed condition of the thermal head 101 during the printing paper feeding operation, it is possible to perform a high speed printing operation.

Figure 4:
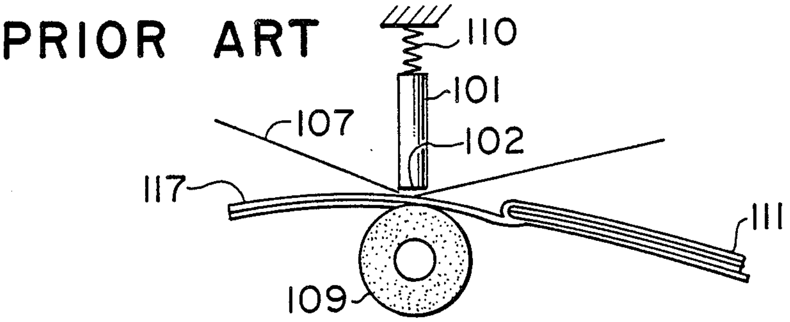
FIG. 4 PRIOR ART
FIG. 4 is a schematic cross-sectional view of the printing section of the conventional printer shown in FIG. 3 when performing a booklet printing.
Figure 5:
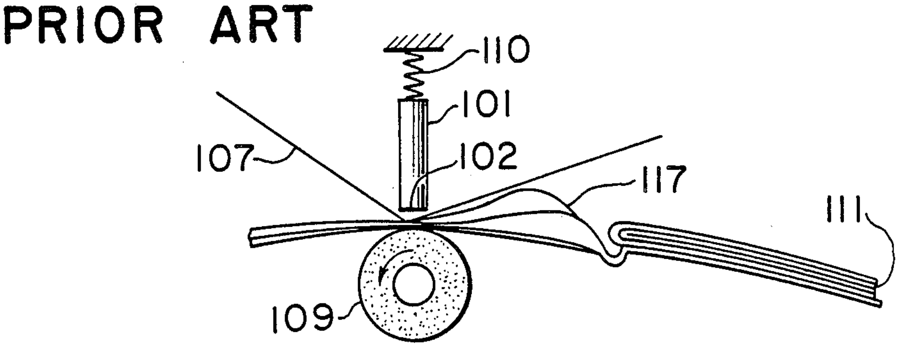
FIG. 5 PRIOR ART
FIG. 5 is a schematic cross-sectional view showing a trouble caused during the booklet printing in the printing section shown in FIG. 4.

FIG. 4 shows the case where the above-described thermal printer is used for printing a booklet such as a bankbook 111. As described hereinbefore, in the thermal printer, in order to obtain a clear print, it is necessary to enhance a contactability between the thermal printing paper, the thermal ink film and the thermal head. In the example shown in FIG. 4, the thermal head 101 is depressed against the bankbook 111 with a high depression pressure, so that the heating resistor 102 of the thermal head 101 is brought into intimate contact with the thermal ink film 107 and the bankbook 111. However, since intermediate printing papers 117 of the bankbook are, in general, relatively thin, if the platen roller 109 is rotated to feed the bankbook 111 under the depressed condition of the bankbook 111 and the thermal ink film 107 with the high pressure, there would be caused a displacement of the intermediate papers 117 with an inflation thereof as shown in FIG. 5.

Figure 1:
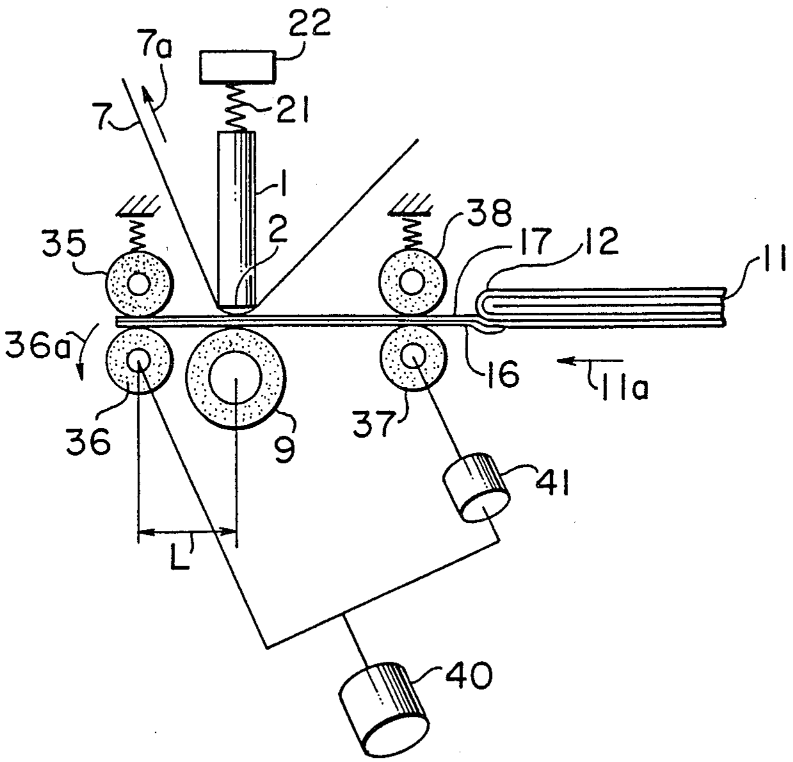
FIG. 1 is a schematic cross-sectional view showing a primary part of a printing section of a printing apparatus according to an embodiment of the invention.

One embodiment of the present invention will now be explained with reference to FIG. 1. The arrangement of the printing apparatus will be described first. In FIG. 1, a thermal head 1 is of the end face type in which a heating resistor 2 is disposed at an end face of the thermal head body. A spring 21 for urging the thermal head 1 is mounted on the thermal head 1. A depression ON/OFF mechanism 22 is provided to be capable of performing the actuation and the release of the depression of the thermal head 1 at a high speed. The depression ON/OFF mechanism may be composed of solenoids or the like, and its detailed structure will be omitted in the drawings. A platen roller 9 is rotatably supported in place and is made of elastic or resilient material having a low hardness.

A thermal ink film 7 is interposed between the thermal head 1 and the platen roller 9 and is fed upon printing from a payout roll (not shown) for the fresh film to a take-up roll (not shown) for the usd film in a direction indicated by an arrow *7a*. A motor or the like is used as drive means for the take-up roll but is not shown in the drawings.

A bankbook 11 is inserted between the platen roller 9 and the thermal ink film 7 in a direction of an arrow 11*a* by means of transport rollers 37 and 38.

Figure 2:
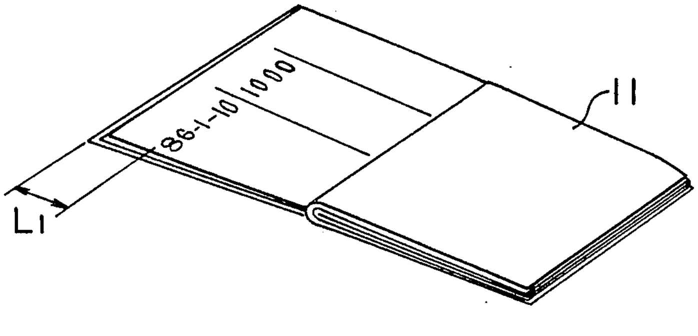
FIG. 2 is a perspective view showing a first printing position of a bankbook to be printed by the apparatus shown in FIG. 1.

A pair of clamp rollers 35 and 36 are disposed at the opposite side to the bankbook insertion side with respect to the thermal head 1 and the platen roller 9. A position, indicated by L, where the clamp rollers 35 and 36 are disposed is determined so that the end of the bankbook may be clamped by the clamp rollers 35 and 36 when the first line of the bankbook is located on the heating resistor 2 of the thermal head 1. In general, the position of the first line, indicated by $L_1$ in FIG. 2, in case of a bound booklet type bankbook is about 20 mm. The clamp rollers 35 and 36 have to be located in view of this clamp distance of 20 mm. Namely, the distance L is not greater than the distance $L_1$. Further, it should be noted that the clamp transporting force of the clamp rollers 35 and 36 is suitably selected. It is necessary to select the clamp force so as not to cause a inflation in the bankbook 11 due to the depression force between the line type thermal head 1 and the platen roller 9.

The transport roller 37 is driven by a motor 40 through an electromagnetic clutch 41, and the clamp roller 36 is driven also by the motor 40.

The operation of the apparatus thus constructed in accordance with the embodiment will be described.

Figure 6:
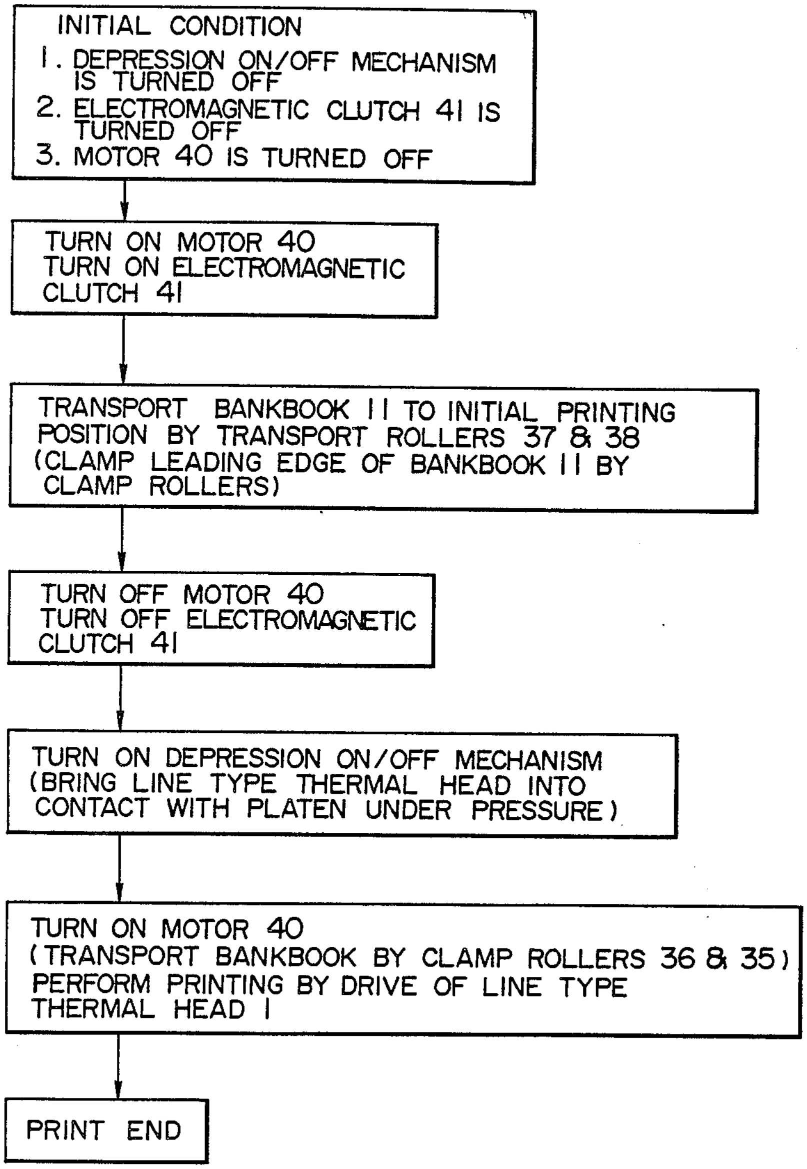
FIG. 6 is a flowchart showing successive operation of the printing apparatus according to the embodiment of the invention.

FIG. 6 shows an operation flowchart of the preceding embodiment. First, the depression of the depression ON/OFF mechanism 22 is released, so that a clearance is produced between the thermal head 1 and the platen roller 9. Then, the electromagnetic clutch 41 is operatively connected and the motor 40 is driven to feed the bankbook 11 up to an initial printing position with the transport rollers 37 and 38. The "initial printing position" means a position where, when the thermal head 1 is depressed against the bankbook 11 without any shift of the bankbook, a predetermined line may be printed. At this time, the leading edge of the bankbook is clamped by the clamp rollers 35 and 36. Subsequently, the depression ON/OFF mechanism 22 is actuated to bring the thermal head 1 into pressing contact with the bankbook 11, and the electromagnetic clutch 41 is turned off to stop a supply of the drive force to the transport roller 37. Thereafter, the clamp roller 36 is driven by the motor 40 in the direction indicated by an arrow 36*a* in FIG. 1, and at the same time, the heating resistor 2 of the thermal head 1 is energized to melt and transfer a thermally soluble ink on the thermal ink film 7, thereby performing the printing or the bankbook 11. This printing process is the same as the well known heat sensitive transfer type thermal print system. The platen roller 9 is subjected to an idle rotation while being depressed against a cover page 16 of the bankbook 11 with the bankbook 11 being drawn by the clamp rollers 35 and 36.

As described above, since the printing is performed with the cover page 16 and the intermediate pages 17 of the bankbook 11 being clamped by the clamp rollers 35 and 36, there is no fear that the intermediate pages 17 would be displaced or inflated during the printing operation, and a good printing is ensured. Also, since the intermediate papers 17 and the cover pages 16 of the bankbook 11 are bound along a fold line 12, when the printing is performed on the succeeding page over the fold line 12, the binding portion along the fold line 12 serves to prevent any displacement of the intermediate pages 17 and the cover page 16. Thus, the inflation of the intermediate papers would not be caused.

Turning to the speed of the printing operation, i.e., the printing performance, the printing system in accordance with the foregoing embodiment is compared with the conventional wire dot print system under the conditions that the number of printing characters per one line of the bankbook is 60 and the distance between the adjacent lines of the bankbook is 5 mm. The result is as follows.

In the case of the wire dot print system, when the printing speed of the printing head is set at 120 characters per one second, the printing time for a single line is about 0.5 seconds.

In the case of the thermal print system according to the embodiment, it is possible to set the operation speed of the thermal head at about 5 ms/dot line. Assuming that 36 dot lines be printed for a single line of the bankbook, this corresponds to the dot printing with an interval of about 1/180 inch, the printing time for the single line in the case of the thermal print system is reduced to the level of $5\times36=180$ ms, that is, 0.18 seconds. Thus, the printing speed of the thermal print system may be about 2.8 times higher than that of the wire dot print system. In addition, according to the thermal print system of the present embodiment, the operation of releasing the platen depression for every line renewal as in the conventional wire dot print system may be dispensed with. Therefore, in comparison with the wire dot print system, it will be apparent that the printing performance of the thermal print system of the embodiment is further enhanced.

As described above, according to the embodiment of the invention, it is possible to enhance a high speed printing with a high quality on the bankbook by using the thermal head that is relatively inexpensive.

Thus, according to the present invention, a line type thermal head that is brought into intimate contact with a printing paper is used as a printing element, and it is possible to compose a printing mechanism without any loss of the advantage of high speed printing of the thermal head. Also for the booklet of a plurality of papers, it is possible to keep a good contactability between the line type thermal head and the printing papers, thereby ensuring a high quality printing without any printing displacement. Also, it is possible to provide a printing apparatus which may be constructed with a low cost printing mechanism.

What is claimed is:

1. A printing apparatus comprising:

a thermal head;

a platen disposed opposite to said thermal head;

a thermal ink film interposed between said platen and said thermal head;

depressing means for pressing said thermal head against said platen through said thermal ink film;

first transporting means for transporting a printing medium to a position between said thermal head and said platen; and second transporting means for clamping and transporting said printing medium, said second transporting means being located opposite said first transporting means with respect to said platen.

2. The printing apparatus according to claim 1, wherein said printing medium is a booklet composed of a plurality of papers bound substantially along a centerline thereof.

3. The printing apparatus according to claim 1, wherein when said printing medium is transported between said thermal head and said platen, said thermal head is located at a first line of said printing medium, and a leading edge of said printing medium is clamped by said second transporting means.

4. The printing apparatus according to claim 1, wherein said thermal head is of a line type.

5. The printing apparatus according to claim 1, wherein said second transporting means comprise a drive roller and a pressure roller disposed to confront with said drive roller.

6. A printing apparatus comprising:

a thermal head;

a platen disposed opposite to said thermal head;

a thermal ink film interposed between said platen and said thermal head;

depressing means for pressing said thermal head against said platen through said thermal ink film;

first transporting means for transporting a printing medium to a position between said thermal head and said platen; and second transporting means for clamping a leading edge of said printing medium and transporting the same when said printing medium has been transported between said thermal head and said platen, whereby, after said printing medium has been transported between the thermal head and the platen by said first transporting means, said printing medium is transported with the leading edge thereof being clamped by said second transporting means, and said thermal head is pressed against said printing medium through said thermal ink film by said depressing means, thus performing a printing operation.

7. The printing apparatus according to claim 6, wherein said printing medium is a booklet composed of a plurality of papers bound substantially along a centerline thereof.

8. The printing apparatus according to claim 6, wherein when said printing medium is transported between said thermal head and said platen, said thermal head is located at a first line of said printing medium, and a leading edge of said printing medium is clamped by said second transporting means.

9. The printing apparatus according to claim 6, wherein said thermal head is of a line type.

10. The printing apparatus according to claim 6, wherein said second transporting means comprise a drive roller and a pressure roller disposed to confront with said drive roller.

11. A printing apparatus comprising:

a thermal head;

a platen disposed to confront with said thermal head;

a thermal ink film interposed between said platen and said thermal head;

depressing means for pressing said thermal head against said platen through said thermal ink film;

depression control means for controlling an operation of said depressing means;

first transporting means for transporting a printing medium to a position between said thermal head and said platen;

transport control means for controlling an operation of said first transporting means; and second transporting means for clamping a leading edge of said printing medium and transporting the same when said printing medium has been transported between said thermal head and said platen by said first transporting means, whereby, when said printing medium has been transported between the thermal head and the platen by said first transporting means, the operation of said first transporting means is stopped under the control of said transport control means, said printing medium is transported with the leading edge of said printing medium being clamped by said second transporting means, and said depressing means is operated under the control of said depression control means so that said thermal head is pressed against said printing medium through said thermal ink film by said depressing means, thus performing a printing operation.

12. The printing apparatus according to claim 11, wherein said printing medium is a booklet composed of a plurality of papers bound substantially along a center-line thereof.

13. The printing apparatus according to claim 11, wherein when said printing medium is transported between said thermal head and said platen, said thermal head is located at a first line of said printing medium, and the leading edge of said printing medium is clamped by said second transporting means.

14. The printing apparatus according to claim 11, wherein said second transporting means include a drive roller and a pressure roller disposed to confront with said drive roller.

15. The printing apparatus according to claim 11, wherein said thermal head is of a line type.

* * * * *